No. 12,167. REISSUED NOV. 3, 1903.

J. F. STEVENS.

BREAD MIXER AND KNEADER.

APPLICATION FILED SEPT. 11, 1903.

2 SHEETS—SHEET 1.

Witnesses.

S. H. Clarke.

P. J. Egan

Inventor.

James F. Stevens.

By James Shepard

Atty.

No. 12,167. REISSUED NOV. 3, 1903.

J. F. STEVENS.

BREAD MIXER AND KNEADER.

APPLICATION FILED SEPT. 11, 1903.

2 SHEETS—SHEET 2.

Witnesses.

J. H. Clarke.

P. J. Egan

Inventor.

James F. Stevens.

By James Shepard.

Atty.

No. 12,167. Reissued November 3, 1903.

UNITED STATES PATENT OFFICE.

JAMES F. STEVENS, OF PORT CHESTER, NEW YORK.

BREAD MIXER AND KNEADER.

SPECIFICATION forming part of Reissued Letters Patent No. 12,167, dated November 3, 1903.

Original No. 733,763, dated July 14, 1903. Application for reissue filed September 11, 1903. Serial No. 172,827.

*To all whom it may concern:*

Be it known that I, JAMES F. STEVENS, a citizen of the United States, residing at Port Chester, in the county of Westchester and State of New York, have invented certain new and useful Improvements in Bread Mixers and Kneaders, of which the following is a specification.

My invention relates to improvements in bread mixers and kneaders; and the objects of my improvement are simplicity and economy in construction and convenience and efficiency in use.

Figure 1:
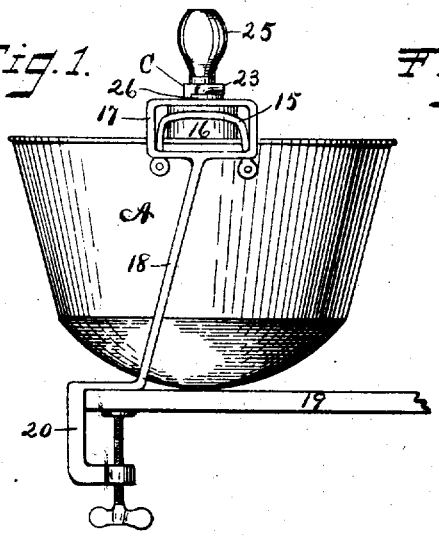
Figure 2:
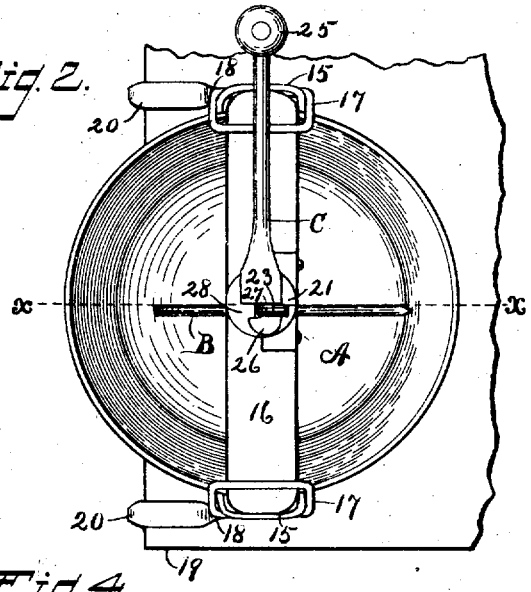
Figure 3:
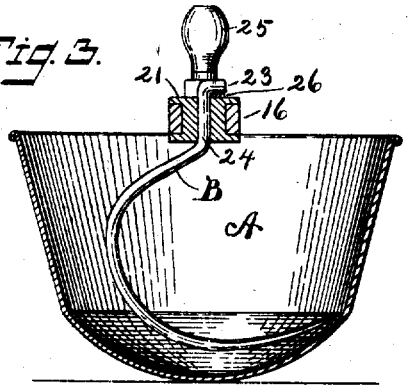
Figure 4:
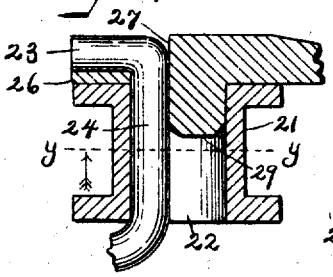
Figure 5:
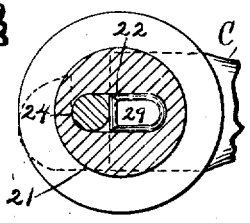
Figure 6:
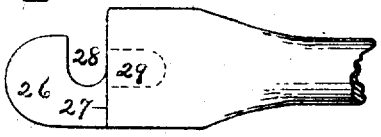
Figure 7:
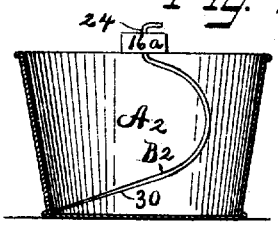
Figure 8:
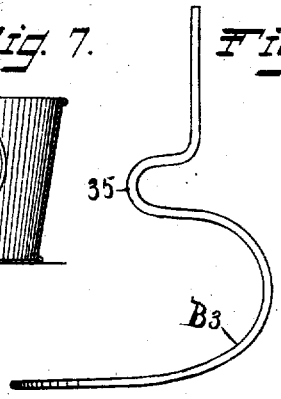
Figure 9:
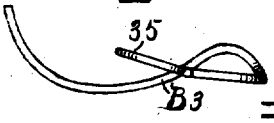
Figure 10:
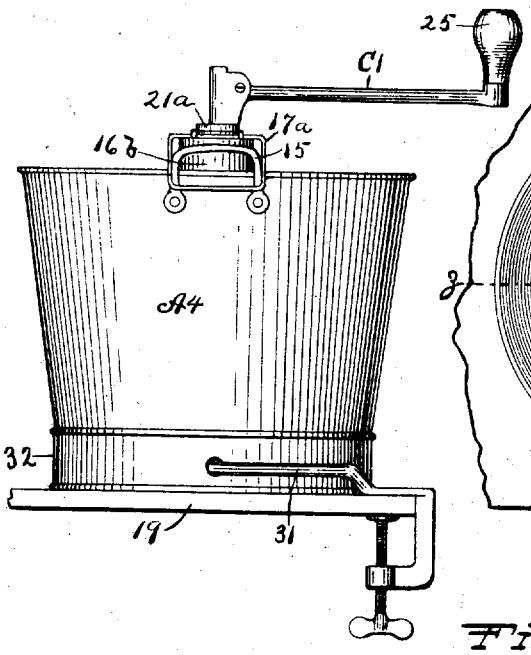
Figure 11:
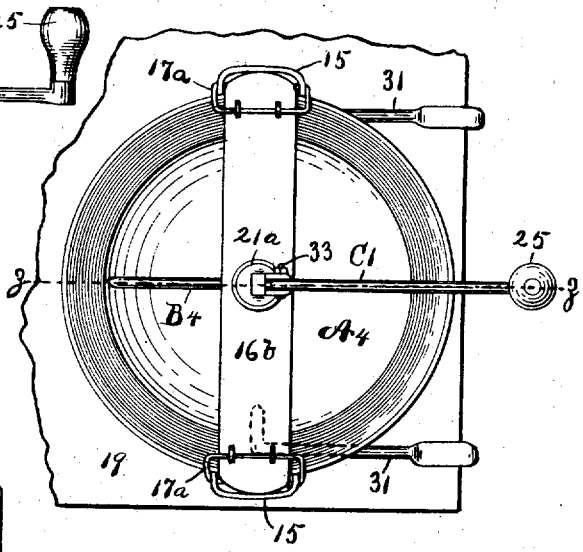
Figure 12:
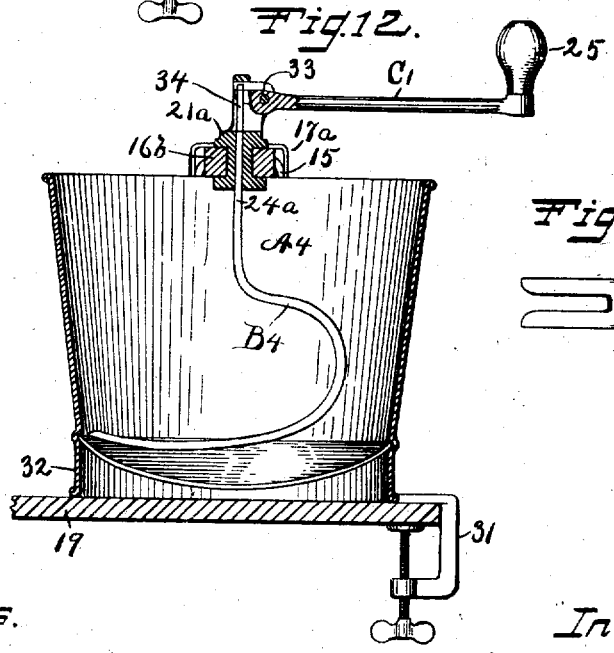
Figure 13:
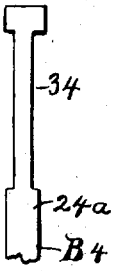
Figure 14:
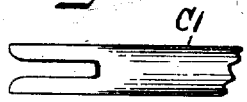

In the accompanying drawings, Figure 1 is a side elevation of my machine, together with a portion of a table to which the said machine is clamped. Fig. 2 is a plain view of the same. Fig. 3 is a sectional view on the line *x x*, Fig. 1, of parts of the same, the beater, which comes in front of the said line, being also shown in elevation. Fig. 4 is enlarged vertical section of parts of the same, taken on the central longitudinal line of the crank, Fig. 1, and with the beater turned back one-quarter of a revolution from the position shown in the said Fig. 1. Fig. 5 is a horizontal section on the line *y y* of Fig. 4 looking upwardly. Fig. 6 is a plan view of a part of the crank. Fig. 7 is a side elevation of a vessel and beater of a modified form and on a reduced scale. Fig. 8 is an enlarged side elevation of another form of beater. Fig. 9 is a plan view of the same. Fig. 10 is a side elevation of my machine, showing further modifications and also a portion of a table to which the said machine is secured. Fig. 11 is a plan view of the same. Fig. 12 is a sectional side elevation of the same on the line *z z* of Fig. 11. Fig. 13 is an enlarged side elevation of the upper end of the beater. Fig. 14 is a plan view of the inner end of the crank.

A designates a round-bottomed vessel, which is a standard form of sponge-kettle. It is provided on opposite sides at the top with bail-like ears 15, that slant outwardly and upwardly. A shaft-bearing support 16 of a width to fit in between the two members of each handle is placed centrally over the vessel and is held thereon by the loops or eyes 17, which extend over the top of the said support at each end and under the ears 15 to detachably lock or hold the said support in place at the top of the vessel. Arms 18, integral with the said eyes, extend obliquely downward from the said eyes to the table 19 and terminate in clamps 20, whereby the kettle, although it has a round bottom, is held to the table, and at the same time and by the same means the shaft-bearing support is also held to the kettle.

Mounted at the middle portion of the shaft-bearing support there is a collar or hub 21, which revolves in proper bearings in said support, the said hub being of a cylindrical form, with a flange at each end. It is provided with an oblong hole 22, extending vertically therethrough. B designates a beater, which I prefer to form of a rod bent into shape, having at its upper end a right-angular arm 23, below which is a straight portion 24 a little longer than the length of the hub 21. Below this straight portion 24 the beater curves transversely to one side and then downwardly and reversely toward the other side and to a greater extent at the lower part than at the upper part. The arm 23 of the upper end of the beater is of a length that will readily pass through the oblong hole 22 in the hub 21, while the said hole is so proportioned to the diameter of the straight portion 24 of the beater that the said portion substantially fits and fills a portion of the oblong hole 22, as shown in Figs. 4 and 5. The crank C may have any suitable handle 25, and its body may be of any desired form. At the inner end it is provided with a lug 26 and a driving-shoulder 27, that extends up above the top of the said lug. An opening 28 of a size and form that will permit the arm 13 of the beater to pass through it is formed near this shoulder 27, as shown, and underneath the crank, near the said opening, is a downwardly-extending projection 29, that fits and substantially fills that portion at the upper end of the oblong hole 22 that is not filled by the straight portion of the beater. In order to assemble the beater and crank in the collar or hub the upper end of the beater is passed through the said hub from below to bring the straight portion of the beater into the position in the said hole 22 shown in Fig. 5. The beater is then turned, so as to bring the arm 23 into a position where it would point upwardly in the said Fig. 5. The crank is then placed in position over the hub and beater to bring the projection 29 over the portion of the hole 22 not occupied by the straight portion 24 and with the opening 28 directly over the arm 23. The crank may then be slipped down into place. The beater is then turned relatively to the crank a half-revolution, so as to carry the arm 23 from its position over the opening 28 around against the holding-shoulder 27 and over the top of the lug 26, as shown in Fig. 2, and is then ready to be driven by the crank when the said crank is turned in the right-hand direction.

In Fig. 7 I have shown a flat-bottomed vessel $A^2$ and beater $B^2$ of somewhat different form, the lower member 30 being straight for a portion of its length. The shaft-bearing support $16^a$ may be of any ordinary construction, and the beater may be mounted therein and attached to the crank in any desired manner. The means already described for so doing may be employed, if desired.

Another form of beater $B^3$ is shown in Figs. 8 and 9, in which there is a short bent portion 35 above the upper member of the beater proper and connecting the beater proper with the upper end of its shaft, the said short bent portion serving to prevent the tendency of the dough to rise on the beater during the kneading operation. Instead of making the upper and lower members all in one plane, as in Figs. 2, 3, and 7, they are in different planes, as shown by the plan view, and the outer end of the lower member is curved horizontally, as shown by the said plan view.

In Figs. 10, 11, and 12 is still another form of vessel $A^4$, which is held down on the table 19 by clamping-arms 31, that engage the bottom rim 32 of the vessel. The ears 15 are substantially the same as in Figs. 1 and 2, while the shaft-bearing support $16^b$ is substantially the same, only the holding-eyes $17^a$ are hinged thereto and do not have the downwardly-extending arms of the said Figs. 1 and 2. It is held to the ears 15 by turning the ears down under the handles. It is also provided with a shaft-bearing hub $21^a$, having a vertical slot through it, while at the upper end the crank C′ is pivoted by the pin 33, the inner end of the crank being forked, as best shown in Fig. 14. The beater $B^4$ has upper and lower lateral members, joined by a curved portion similar to the other beaters, while the straight portion $24^a$ at the upper end is flattened to fit the slot in the hub $21^a$ and is provided with a reduced and shouldered portion 34 for being engaged by the forked end of the crank. The beater shown in Figs. 8 and 9 is adapted to work in a vessel of the form shown in Fig. 12, and when placed therein the said beater and vessel would be relatively shaped substantially as shown in the said Fig. 12 with reference to the lower member and bottom of the vessel.

It is essential to the practical operation of the machine that some means shall be employed to hold the vessel firmly on some support and that the shaft-bearing support shall be attachable to and detachable from the vessel; but the particular means for so holding the vessel and for attaching the shaft-bearing support are not essential; neither is the form of the shaft-bearing support essential to my invention, although for some reasons a simple cross-arm is preferable to a spider form for such support. The shape of the vessel alone is not essential; but for a good and efficient kneader the vessel and beater should be relatively shaped substantially as shown. In all of the beaters shown there is a laterally-extended upper member and a laterally extended lower member connected therewith by a bend, all so disposed with reference to the shape of the vessel that the connecting-bend does not so nearly reach the side of the vessel as does the outer end of the lower member and also so relatively disposed that the outer end or greatest lateral projection of the lower member shall come closely to the side of the vessel. The proper point for this end to come closely to the vessel is at the bottom corner as formed by the junction of the sides and bottom of the vessel. This causes the beater in its revolution to wipe or nearly wipe the bottom of the vessel at its outer edge, while there is an open space left between the lower member of the beater and bottom of the vessel and also between the connecting-bend and side of the vessel for the dough being kneaded to work under or back of and escape. It is believed that while almost any form of beater will serve as a mixer until the dough reaches a certain consistency it is essential to the kneading operation that provision shall be provided for the escape of the dough between the beater and the vessel, substantially as herein described. I prefer to provide this space for escape both under the beater and by the side of the connecting-bend; but the space under the beater will greatly facilitate the kneading process without the space between the connecting-bend and side of the vessel. In all forms of the beater shown the beater is composed of substantially a rod-like member, which when detached from the machine is free from all collars, hubs, or other enlarged diameter, so that the beater can be freed or cleaned from the mass of dough by means of a slotted or perforated blade-like cleaner, through the slot or perforation of which the beater may be drawn.

While the particular means for attaching the beater in the hub and to the crank may be varied without departing from the other features of the machine, I prefer to employ the means illustrated in Figs. 1 to 6.

It is apparent that some changes from the specific construction herein disclosed may be made, and therefore I do not wish to be understood as limiting myself to the precise form of construction shown and described, but desire the liberty to make such changes in working my invention as may fairly come within the spirit and scope of the same.

I claim as my invention—

1. The combination of a vessel with a beater mounted to revolve therein and consisting of a single curved or bent shaft having laterally-extending upper and lower members with a connecting-bend, the said lower member and bottom of the vessel being relatively disposed with the outer end of the beater closely approaching the vessel and with an open space for the escape of dough between the under side of the said lower member and the bottom of the vessel, substantially as described.

2. The combination of a vessel with a beater mounted to revolve therein and consisting of laterally-extending upper and lower members with a connecting-bend, the said bend and lower member being disposed relatively to the sides and bottom of the vessel so as to provide a working space between the said bend and side of the vessel and between the said lower member and bottom of the vessel, while the outer end of the said lower member closely approaches the vessel, substantially as described.

3. The combination of the vessel having bail-like ears, with the shaft-bearing support having its ends fitted to rest between the two members of the said ears, fastening-loops for extending over the ends of the said support and under the said ears, means for clamping the said vessel to a table, a beater detachably mounted to revolve in the said shaft-bearing support, and a crank detachably mounted at the upper end of the said beater, substantially as described.

4. The combination of the hub 21, having the oblong hole therethrough, with the beater having the straight shaft-like portion 24, right-angular arm 23, and a crank having the lug 26, driving-shoulder 27 and downwardly-extended projection 29 for fitting the space in said oblong hole by the side of the said shaft-like portion, substantially as described.

5. The combination of a vessel having an inner bottom corner or angle at the junction of its sides and bottom, with a beater mounted to revolve therein, on a vertical axis, and having a lower member with the outer portion thereof arranged for closely approaching the said corner and sweeping the entire circle thereof, while the said lower member extends inwardly from the said corner to the axis of the beater at a gradually-increasing distance from the said bottom.

6. The combination of a vessel with a beater mounted to revolve therein and consisting of a single curved or bent shaft having laterally-extending upper and lower members with a connecting-bend, and having also the short bend connecting the beater proper with the upper portion of the said shaft, substantially as described.

JAMES F. STEVENS.

Witnesses:
DANIEL HAIGHT,
CHRIS HANSEN.